United States Patent [19]

Schräder

[11] Patent Number: 4,707,024

[45] Date of Patent: Nov. 17, 1987

[54] SAFETY SEAT FOR THE CONVEYANCE OF BABIES AND VERY SMALL CHILDREN IN VEHICLES

[75] Inventor: Margarete Schräder, Marktleugast, Fed. Rep. of Germany

[73] Assignee: Frankonia Kinderausstattungen GmbH & Co. KG, Düren, Fed. Rep. of Germany

[21] Appl. No.: 872,664

[22] PCT Filed: Sep. 11, 1985

[86] PCT No.: PCT/DE85/00317

§ 371 Date: Jun. 9, 1986

§ 102(e) Date: Jun. 9, 1986

[87] PCT Pub. No.: WO86/01778

PCT Pub. Date: Mar. 27, 1986

[30] Foreign Application Priority Data

Sep. 13, 1984 [DE] Fed. Rep. of Germany ....... 8427054
Feb. 22, 1985 [DE] Fed. Rep. of Germany ....... 3506122

[51] Int. Cl.$^4$ .................... A47D 15/00; B60R 21/00
[52] U.S. Cl. .................... 297/250; 297/216; 297/464
[58] Field of Search .............. 297/250, 216, 464, 313, 297/355

[56] References Cited

U.S. PATENT DOCUMENTS

| 2,367,829 | 1/1945 | Shinn | 297/313 |
| 3,290,050 | 12/1966 | Ezquerra | 397/313 X |
| 4,033,622 | 7/1977 | Boudreau | 297/250 |
| 4,205,877 | 6/1980 | Ettridge | 297/250 X |
| 4,231,612 | 11/1980 | Meeker | 297/250 |
| 4,500,133 | 2/1985 | Nakao | 297/250 |

FOREIGN PATENT DOCUMENTS

| 2220987 | 11/1973 | Fed. Rep. of Germany | 297/313 |
| 2545915 | 4/1976 | Fed. Rep. of Germany | 297/250 |

Primary Examiner—James T. McCall
Attorney, Agent, or Firm—Spencer & Frank

[57] ABSTRACT

A safety seat for the conveyance of babies and small children in vehicles, including a holder frame, a seat shell swivelably on the holder frame for pivotal movement about a swivel axis and so as to define an area of overlap between a bottom of the seat shell and the holder frame, and structure for locking the seat in a plurality of angular positions relative to the holder frame, this structure including a locking catch in the area of overlap between the bottom and the holder frame, and being spaced far distant from the swivel axis. The locking catch includes a locking member manually retractably shiftable into locking engagement with the holder frame when the seat frame is in any one of the angular positions.

42 Claims, 8 Drawing Figures

SAFETY SEAT FOR THE CONVEYANCE OF BABIES AND VERY SMALL CHILDREN IN VEHICLES

BACKGROUND OF THE INVENTION

The invention relates to a safety seat for the conveyance of babies and very small children.

So-called safety car seats for very small children are available on the market in conventional versions. As a rule, they have an upholstered seat shell, which can be swiveled and locked in a holder frame in a plurality of pivoted positions between an upright sitting position and a horizontal lying position. A swivel bearing is located in each of the two side portions of the seat shell, and a pushbutton-actuated locking catch is integrated with the swivel bearing. As a result, between the pivot point and the locking member only a very short lever arm is ever available for effecting the locking action.

The conventional safety seats, in order to be secured, have a U-shaped opening in both armrests. The lap portion of an automatic lap and shoulder safety belt, or a lap belt, can be drawn under fixed brackets located in both armrests. Guiding the belt in this way has the disadvantage that the safety seat can be fixed securely in only one direction, for instance in the direction opposite the direction of travel.

Since in order to adjust the inclination of the seat both locking catches must be released simultaneously by actuating a pushbutton, two hands must always be used to operate it. In addition, adjustments once the seat is in the installed position can be made only with difficulty, because either the foot or head end of the seat shell rests against the vehicle upholstery. Adjustment is made still more difficult by the fact that easy swiveling of the seat is hindered by the spatial distance, and hence by the effective lever arm, between the pivot point and the location of the belt guides.

BRIEF SUMMARY OF THE INVENTION

It is the object of the present invention to devise a safety seat for the conveyance of babies and very small children in vehicles, which is equipped with particular safety features for traveling and additionally is very easy to operate.

This object is attained by means of the novel characteristic of the invention wherein the safety seat includes a holder frame, a seat shell swivelably supported in the holder frame for rotation about a swivel axis, so as to define an area of overlap between a bottom of the shell and the holder frame, and so as to be lockable in various swiveled positions relative to the holder frame, and at least one belt guide for receiving an automatic lap and shoulder belt or lap belt, there being provided a locking catch located far distant from the swivel bearing so as to obtain a long lever arm on the part of the locking action in said overlap area, the locking catch including a manually operable locking member which is shiftable toward the holding frame and can be brought into engagement with the holding frame. Since the locking catch is disposed in a region of the outside of the seat shell located far distant from the swivel bearing, between the holder frame and seat shell in the area of overlap between them, the lever arm between the pivot bearing and the locking catch is very long, in contrast to conventional seats. The forces prevailing at the locking catch in the event of a possible collision are accordingly less, and breakage of the locking member and an attendant centrifugal motion of the seat, in which strong forces of acceleration act upon the baby, are thereby avoided. Thus a single locking catch is entirely sufficient, and this makes it possible to adjust the inclination using only one hand.

According to another novel characteristic of the invention, wherein the seat shell is approximately V-shaped in longitudinal cross-section and has V-like legs substantially at right angles to one another to form a backrest and legrest, and the locking catch is disposed substantially centrally outside of the shell bottom encompassing the area of the seat of an occupant of the safety seat, in a rounded transitional zone between the backrest and the legrest, the locking catch is disposed virtually at the vertex between the V-like shanks of the backrest and legrest. A lever arm of maximum length is thereby assured. An overall balance of forces is attained in the vicinity of the locking catch.

According to other novel characteristics of the invention, wherein the holder frame has a lock abutment located opposite the locking catch and has detent recesses, corresponding to the desired swivel positions, for the locking member, and the detent recesses in the lock abutment are disposed on a circular arc extending about the swivel axis and have a radius approximately corresponding to the distance between the locking member and the swivel bearing, it is assured that the forces operative between the locking member and detent recesses do not differ considerably from one another at the various swiveling positions. This is an advantage from the standpoint of designing the structure of the locking member and the lock abutment.

By means of the lever constructions of the invention, wherein the locking catch has a detent lever on which the locking member is located, the detent lever being actuatable by means of at least one release lever, the locking catch becomes very easy to operate. The ease of operation is further increased by the feature wherein a release lever is disposed on the foot and/or head of the seat shell, because the release lever attached to the foot and/or head end of the seat shell is easily reachable on account of its exposed position.

The following novel characteristics of the invention define a particularly advantageous mode of construction for the locking catch and its actuation. The locking catch is releasable by means of the detent lever and the detent lever is actuatable by means of a pulling means (actuating rod). The locking member can be disengaged by being pulled out of detent recesses provided on the lock abutment of the holding frame. The release lever has a single-armed lever, is swivelably articulated on the head end and/or foot end of the seat shell outside thereof and has a pivot bearing for receiving the actuating rod. One release lever each is attached to the head end and the foot end of the seat shell at the outside thereof. Two actuating rods are rotatably secured each with one end on a respective release lever. The detent lever is embodied as a double-armed lever, the arms of which each include an oblong slot for longitudinally guided reception of bent ends of the actuating rods, these bent ends being remote from the release levers, as a result of which detent lever can be pulled taut for effecting unlocking by means of an actuating rod, but cannot be pushed away. Taking all the advantages together, the locking catch operates smoothly and can be operated with one hand from either end of the seat. The release levers are easily accessible because of their spatial arrangement, and it is particularly advantageous that releasing the locking catch can be done by actuating merely one of the two release levers. The seat shell can thus be adjusted from either the foot or the head end, thereby avoiding awkward operation. Despite the ease of operation described, the construction has a high degree of stability, and hence safety, in use.

Because of the runner-type structure of the holder frame of the invention, wherein the holder frame includes two support runners extending in the longitudinal direction of the seat shell, which are located beside the seat shell and are joined to one another by means of a crosspiece, a torsion-proof, stable mounting of the seat shell is attained. Because the crosspiece and straight spars are in the same plane the support runners each being a combination of one straight spar and one upwardly extending curved spar formed in one piece, wherein the straight spars engage the plane on which the holder frame stands, at least one crosspiece being disposed in the plane on which the holder frame stands, the holder frame of the safety seat has a large contact surface. Thus, when it is used for example in a motor vehicle, the holder frame does not press as far into the upholstery and thus treats it gently, avoiding damage. At the same time, these crosspieces, between which the lock abutment having the detent recesses is secured approximately centrally in the longitudinal direction of the holder frame, serve as supports for the lock abutment.

By means of another novel characteristic of the invention, wherein the underside of the lock abutment is disposed in the same plane as the crosspieces and the straight spars of the support runners a particularly stable, torsion-proof construction of the holder frame and a simultaneously larger contact surface are attained.

It should be noted at this point that the support runners described herein can serve as elements that connect to various supporting frames. Multifunctional applications of the safety seat thereby become possible; for instance, it can serve as an attachment mounted on a carriage frame, thereby becoming a baby carriage or stroller. It is also conceivable as a seat on a high supporting frame, so that for instance it can be used as a baby's highchair for placement at the dining table.

By means of another novel characteristic of the invention, wherein the ends of the runners of the holder frame protrude, in every swiveled position of the seat shell, beyond the outlined surface projected into the plane on which the holder frame stands, a further advantage in use is attained. For example, the safety seat can be additionally fixed on the back seat of an automobile by clamping the base runners in place between the seatback and the backrest of the front seat, without having to give up the swivelability of the seat shell.

Safety seats of the invention, wherein the opposed ends of the straight spars are joined to one another by means of further crosspieces and at least one opposed pair of straight spar ends is bent downwardly or upwardly at an obtuse angle to the plane on which the seat stands, have the advantage that in an accident an additional lever arm becomes operative because of the bent pairs of straight spar ends; this lever arm and the upholstery together are capable of absorbing energy.

The protection provided by the safety seat in the event of an accident is still further improved by embodying the subject of the invention such that the opposed ends of the straight spars, preferably located toward the foot end of the seat shell, are joined together by means of a crosspiece which, extending outside the plane on which the seat stands, preferably in a vertical curve, forms an impact surface, the highest point on the crosspiece with respect to the plane on which the seat stands are located higher than the swivel bearing of the seat shell, and the crosspiece is formed in either stirruplike or platform-like fashion. The upwardly extended crosspiece for joining the opposed ends of the straight spars creates an impact surface which during travel rests against the backrest of an automobile seat. In a rear-end collision, the entire seat construction is supported via this impact surface, which on the one hand assures that the seat will securely remain in position, while on the other kinetic energy can be absorbed by means of an intentional deformation of this crosspiece in a manner similar to that in the energy-absorbing or deformable zone of a car. The crosspiece as a whole thus is no longer linear but instead is substantially curved into a semicircular shape. A particularly stable construction is created by providing that an approximately semicircular plate serves as the crosspiece.

By means of the variously disposed belt guides, universal utility of the safety seat is attained. The seat can be secured in the vehicle facing either forward or backward in terms of the direction of travel, or crosswise thereto, by means of the existing seat belt in the vehicle. These various possibilities are shown in exemplary embodiments for the sake of better comprehension. These various possibilities can also be realized in safety seats that do not necessarily include the characteristics described above.

Another novel characteristic of the invention, the belt guides, being secured to each of the curved spars of the support runners, extending upward at a right angle substantially to the same position as the swivel bearing, assures that no torque is exerted upon the seat shell by the vehicle seat belt when the safety seat is being fixed in position. The ease of adjustment of the safety seat is not impaired. According to another characteristic in which the belt guide has approximately the form of a rectangular tube, the outside of which is substantially centrally slit continuously in the longitudinal direction of the tube, the belt guides are embodied in such a way that in contrast to the guides on conventional seats they can provide guidance in two directions. For the best guidance, it is advantageous for the guide to be embodied as a rectangular tube. For the belt guides at the ends of the support runners, however (see FIG. 7), it is also conceivable to use only a thick, flat metal wire, bent at right angles with its two ends located spaced apart from and facing one another.

A particularly advantageous further development of the subject of the invention is attained by combining novel characteristics of having at least one opposed pair of straight spar ends bent downward or upward at an obtuse angle to the plane on which the seat stands and cumulatively or alternatively securing additional belt guides in the vicinity of the runner ends, in particular, to the curved spars or straight spars. A belt guide is attached to the top of each of two opposed straight spar ends, which are bent upward forming an obtuse angle with the plane on which the seat stands. As a result, additional fixation points for the holder frame are obtained by placing the lap and shoulder belt in contact with both tubes. Bending the ends of the straight spars and thereby raising the belt guide position assures that the contact points of the lap and shoulder belt on the holder frame are always located higher than the belt buckle of the seat. This contributes to simple belt guidance and secure fastening of the seat. A high degree of convenience of operation is attained by embodying the belt guides by providing the belt guide approximately in the form of a rectangular tube, the outward side of which is substantially centrally slit continuously in the longitudinal direction of the tube.

The simple belt guide brackets having one or more stirrup-like belt guides, open at one end in such a manner that the belt can be inserted from the open end, substantially vertically disposed with the open end at the top, disposed on the outside of the seat shell on the head end and/or the foot end, are intended for when the safety seat is used facing backward from the direction of travel. Because of the special embodiment of these brackets, with an open end facing upward, it is easy to feed the safety belt into the guide brackets. Nevertheless, the belt is held securely in the event of an accident, because the open end of the belt guides is located pointing upward, while contrarily the forces exerted upon the belt guides if the car strikes an obstacle are exerted downward.

By an alternative belt course effected via the belt guides disposed in the head and foot portion of the seat (see FIG. 7), the baby can be removed from the seat more quickly in an emergency, because the lap and shoulder belt of the car passes only around the seat shell, rather than over it. All that needs to be done is to release the retaining device (belt, impact surface, retainer netting) of the seat itself.

According to another novel characteristic of the invention, wherein the seat shell has upwardly extending side walls such that the rim of the seat shell is located approximately in one plane, so that a particularly high degree of protection of the baby is attained. The upholstered cushion extending continuously around the seat still further reduces the risk of injury in the event of an accident.

Another novel characteristic of the invention, wherein in each of the two side walls of the seat shell, in the head and foot regions, two receiving slits for two carrying straps are provided, which in the active position extend over the open side of the seat shell, the ends of which are secured in the respective receiving slits located transversely opposite one another, makes the safety seat particularly easy to lift and carry. So that the carrying straps will not present any problems during use, for instance in a car, they can be pulled across and over the rim of the seat shell to the outside thereof. There, they rest tautly on the outside.

Other novel characteristics of the invention, wherein a safety retaining device, for retaining the baby or very small child, includes an impact plate secured to the belt straps, a retaining netting which can be secured directly to the seat shell or a bag in which the body sits, surrounding the area of the baby's body remote from the chest, relate to particularly reliable and practical devices for safely buckling in or retaining a baby. An impact plate or retaining netting considerably reduces the pressure forces exerted upon the body in an accident. A seat bag or pouch used as a safety retaining device also has the practical advantage that it not only provides protection in an accident but also affords protection from the cold, which is particularly important for a baby.

In summary, the description shows that the safety seat according to the invention for conveying babies and very small children in vehicles has many advantages over seats of the conventional type. It can be fixed universally in place, facing in the direction of travel or facing backward or sideways, by means of the appropriate belt guides. Its seat shell can be adjusted simply, smoothly and with one hand using the externally located release lever. The safety seat is always movable, because of the support runners that extend far to the outside. Because the locking catch is located far from the swivel axis, particularly favorable lever ratios are attained for locking purposes, and as a result the seat is particularly well able to absorb the forces occurring in an accident. A substantial increase in safety as compared with conventional seats is thereby attained.

BRIEF DESCRIPTION OF THE DRAWINGS

The invention will be described in greater detail in terms of an exemplary embodiment, in conjunction with the accompanying drawings. Shown are.

DETAILED DESCRIPTION OF THE PREFERRED EMBODIMENTS

Figure 1:
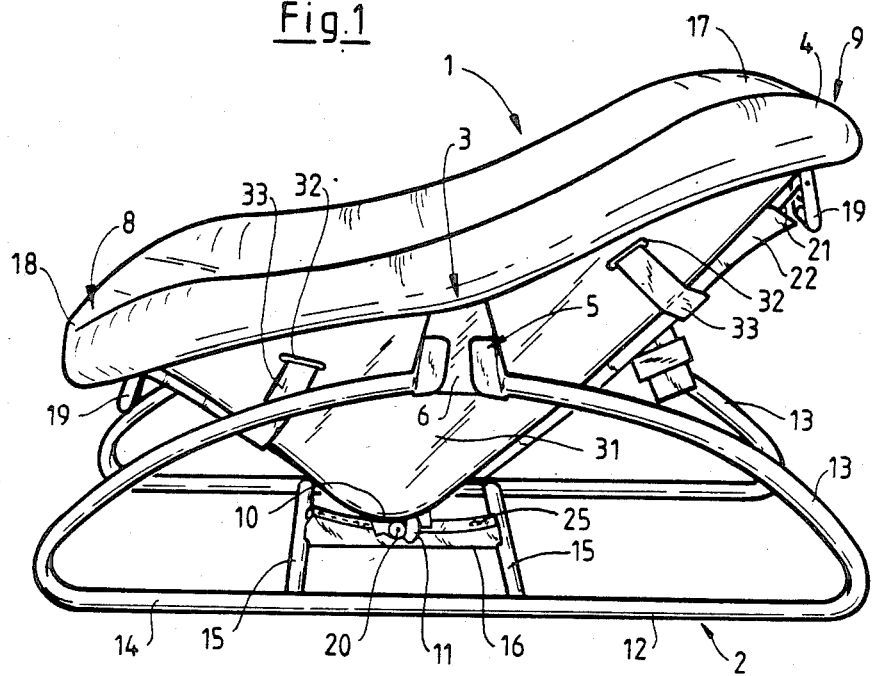
FIG. 1, a perspective side view of a safety seat.

As shown in FIG. 1, the safety seat comprises a seat shell 1, which is swivelably supported in a holder frame 2. The swivel bearing 3 is located where it is not visible, underneath the upholstered rim 4 extending continously around the seat. The belt guide 5 is attached in virtually the same position as the swivel bearing 3, and the lap portion of a safety belt which is a lap and shoulder belt, or a lap belt 7, can be introduced through the slit 6 of the belt guide 5. In the transitional zone between the legrest 8 and the backrest 9, the locking catch 11 is disposed on the outside of the seat shell bottom 10.

The holder frame 2 comprises two support runners 12, which are a combination of the curved spar 13 and the straight spar 14. The two straight spars 14 are joined by crosspieces 15, between which the lock abutment 16 is located. As the drawing shows, the undersides of the straight spars 14, crosspieces 15 and lock abutment 16 are located in the same plane.

To actuate the locking catch, the two single-armed release levers 19 are articulatedly attached to the head end 17 and foot end 18 of the seat. The release levers 19 are each connected to the detent lever 20 of the locking catch 11 via respective actuating rods 21, which extend underneath the coverings 22.

Figure 3:
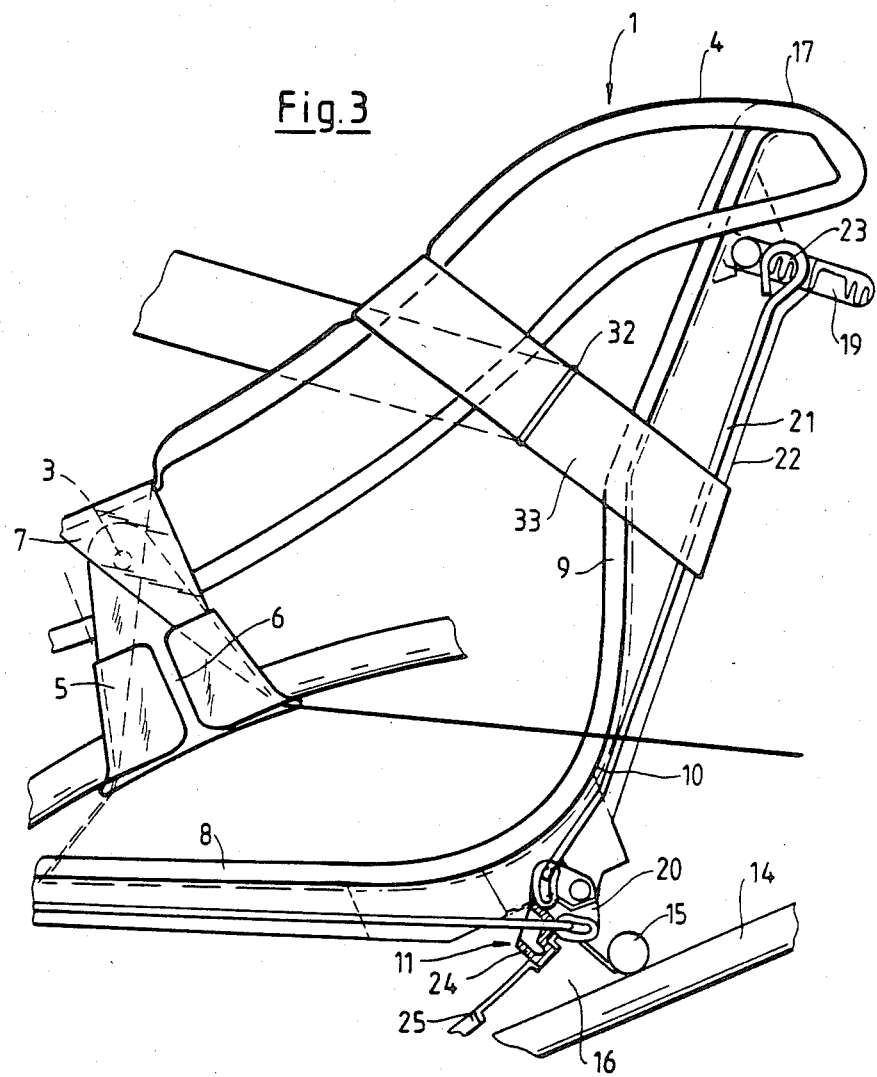
FIG. 3, a detail in longitudinal section taken through a safety seat in order to show the assembly comprising the release lever, actuating rod and locking catch.
Figure 4:
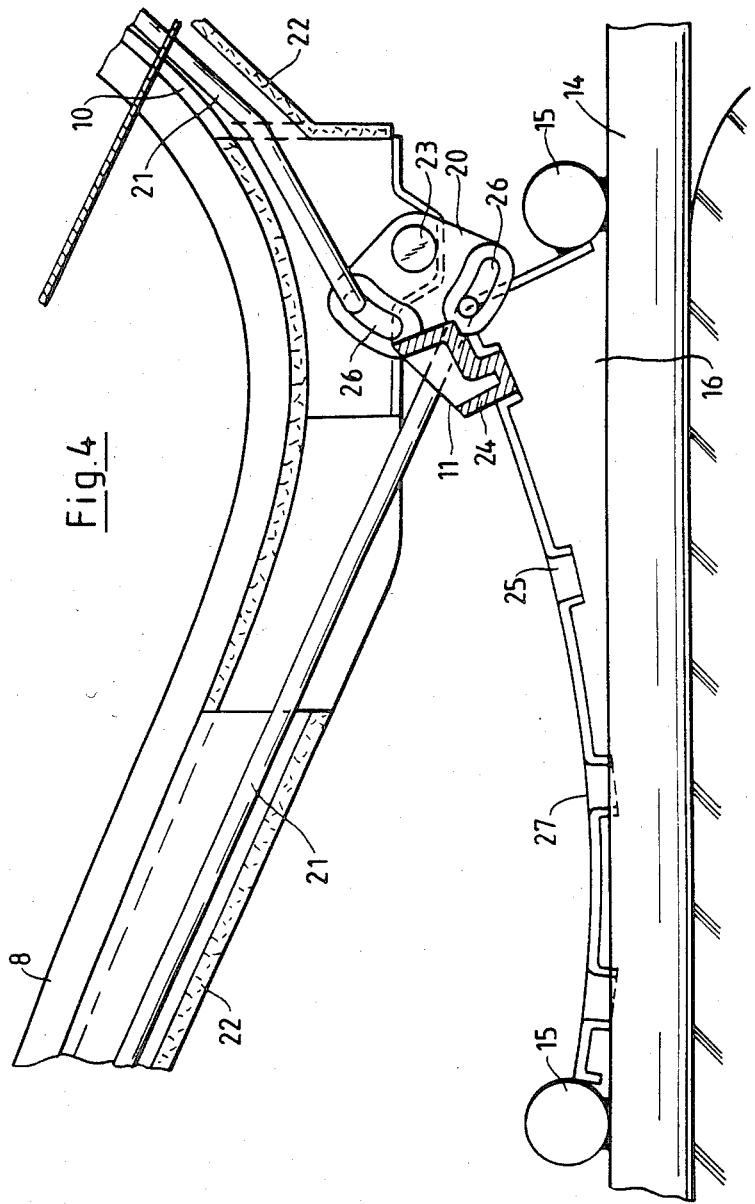
FIG. 4, a detail in longitudinal section taken through the locking catch and the locking abutment.

The exact construction is shown in FIG. 3. The release lever 19 articulatedly connected to the head end 17 of the seat shell includes a pivot bearing 23 for receiving the actuating rod 21. This rod extends substantially parallel to the outside of the backrest 9 of the seat shell 1, down to the detent lever 20. The locking member 24 is attached to this lever and can be disengaged from the detent recess 25 in the lock abutment 16 by pulling the release lever upward. The second actuating rod 21 is disposed similarly to the first actuating rod 21 but in the opposite direction, being joined to the release lever 19 at the foot end 18 of the seat shell. As shown particularly clearly in FIG. 4, the two actuating rods 21 terminate in respective oblong slots 26; both rod ends, in the detent position of the locking member, rest on the ends of the oblong slots pointing toward the respective release lever 19. If one release lever is pulled, the detent lever 20 is rotated, whereupon the end of the other actuating rod 21 can shift in the oblong slot 26. As a result, both actuating rods 21 and thus the release lever 19 are independent of one another in their motion.

The detent recesses 25 for receiving the locking member 24 are located on the circular arc 27, which has approximately the radius of the distance between the locking member 24 and the swivel bearing 3.

Figure 2:
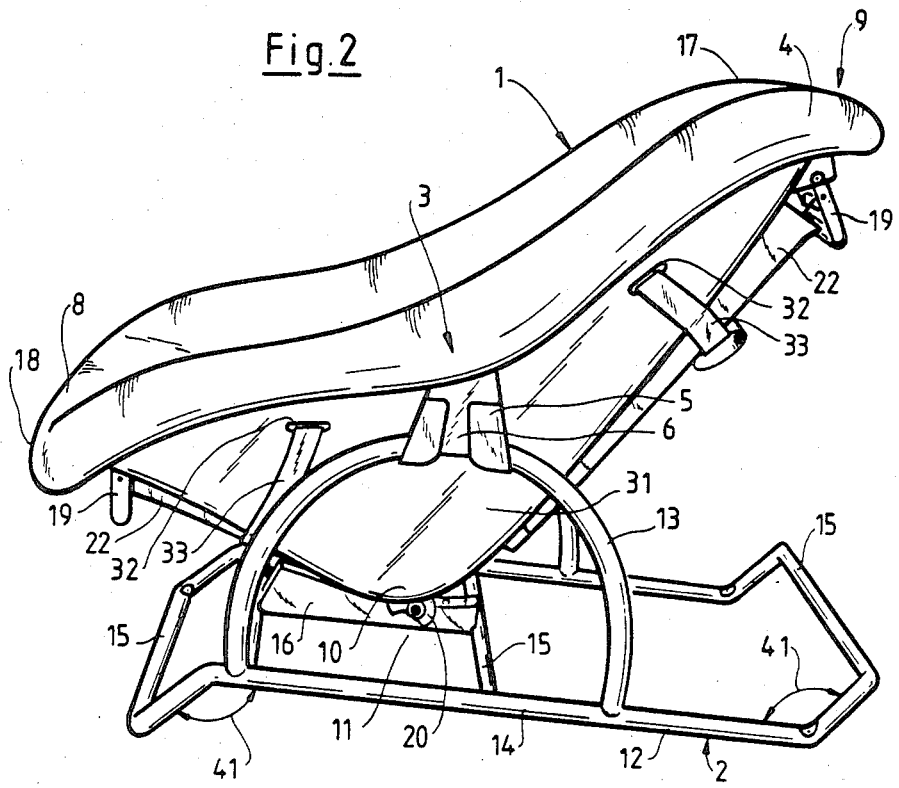
FIG. 2, a side view analogous to FIG. 1 having bent pairs of straight spar ends on the support runners.

FIG. 2 shows an embodiment of the safety seat with an alternative form of the support runner ends. These ends are bent downward or upward at an obtuse angle 41 and are joined to one another by means of further crosspieces 15.

Figure 5:
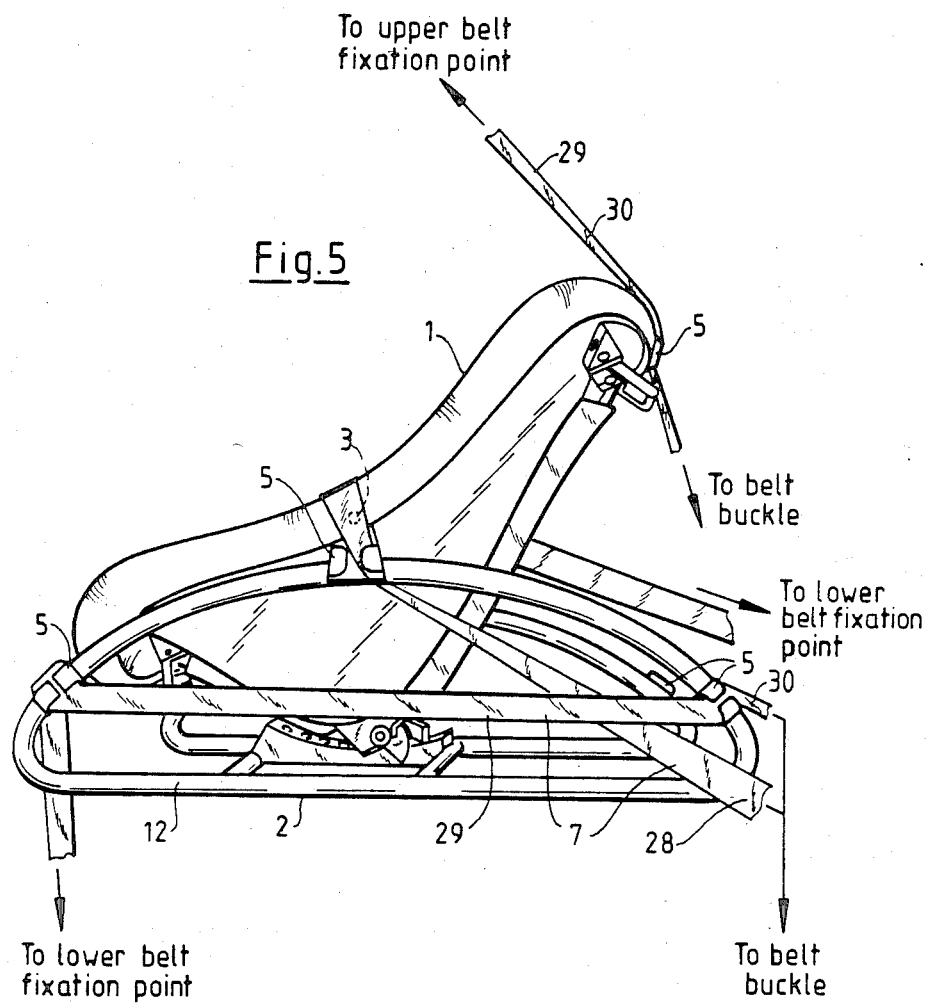
FIG. 5, a schematic perspective side view of a safety seat schematically showing the course of the belt for various installed positions.

In FIG. 5, various possible directions of the course of the belt are shown. By means of the alternatively or additionally attached belt guides 5, universal possibilities for installing the safety seat on a vehicle seat are provided. One example is the belt course 28, where the safety seat is installed with the baby facing in the direction of travel. If the safety seat is to be installed crosswise to the direction of travel, then the belt guides 5 attached to the support runners 12 is used, and the belt 30 is guided as indicated by the belt course 29. Depending on the direction of installation, the shoulder portion of an automatic lap and shoulder belt 30 is used to fix the seat shell in position (belt course 29), or else the belt simply runs upward along the backrest of a vehicle seat (belt course 28).

As shown in FIGS. 1 and 2, receiving slits 32 for the ends of carrying straps 33 are provided in the side walls 31 of the seat shell 1. In the inactive position of the carrying straps shown in FIGS. 1 and 2, these straps rest tautly on the outside wall of the seat shell 1. For use, they are pulled up and over the rim 4 and then pass over the open side of the seat shell 1.

Figure 6:
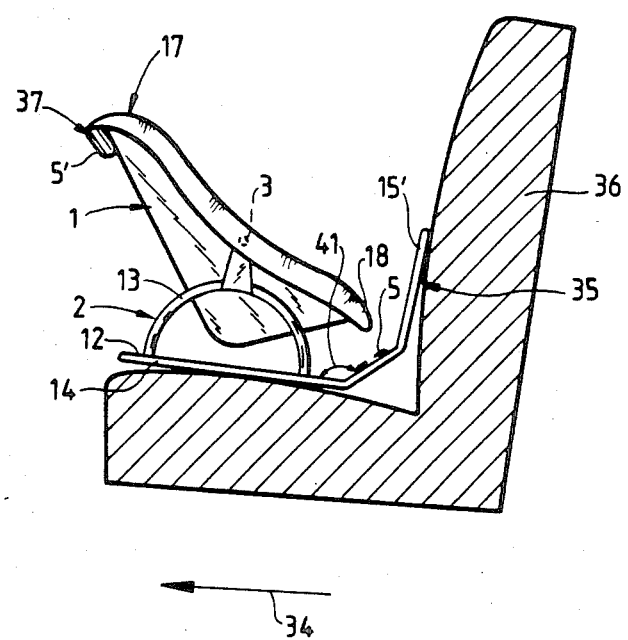
FIG. 6, a schematic side view of a safety seat having an impact surface according to claim 18 (installed position facing backward from the direction of travel; the belt is not shown here, for the sake of simplicity)

A particularly advantageous embodiment of the holder frame 2 in terms of safety is shown in FIG. 6 showing an exemplary installation of the safety seat facing backward with respect to the direction of travel 34. For the sake of simplicity, the belt course was not shown here. The pairs of straight spar ends toward the foot end are bent upward at an obtuse angle 41. The approximately rectangular belt guides 5 are secured to the top of these pairs. Differing from the belt guide located on the swivel bearing 3, these belt guides may be formed by bending a thick metal wire, without any loss of safety. The crosspiece 15' for joining the two opposed straight spar ends is embodied such that it extends substantially vertically upward in an arc, out of the plane of the support runners 12. Its highest point with respect to the plane on which the seat stands is higher than the swivel bearing 3. This specialized shaping of the crosspiece 15' creates an impact surface 35, which enables supporting of the entire holder frame 2 against the seat back 36, for instance in the event of a rear-end collision. By means of a previously calculated deformation of the crosspiece 15', kinetic energy can be absorbed, in a manner similar to that of the energy-absorbing deformable zone of a motor vehicle. In detail, the crosspiece 15' may be stirrup-like, more or less like the curved spar 13, but the use of a semicircular impact surface makes for a particularly stable construction.

Figure 7:
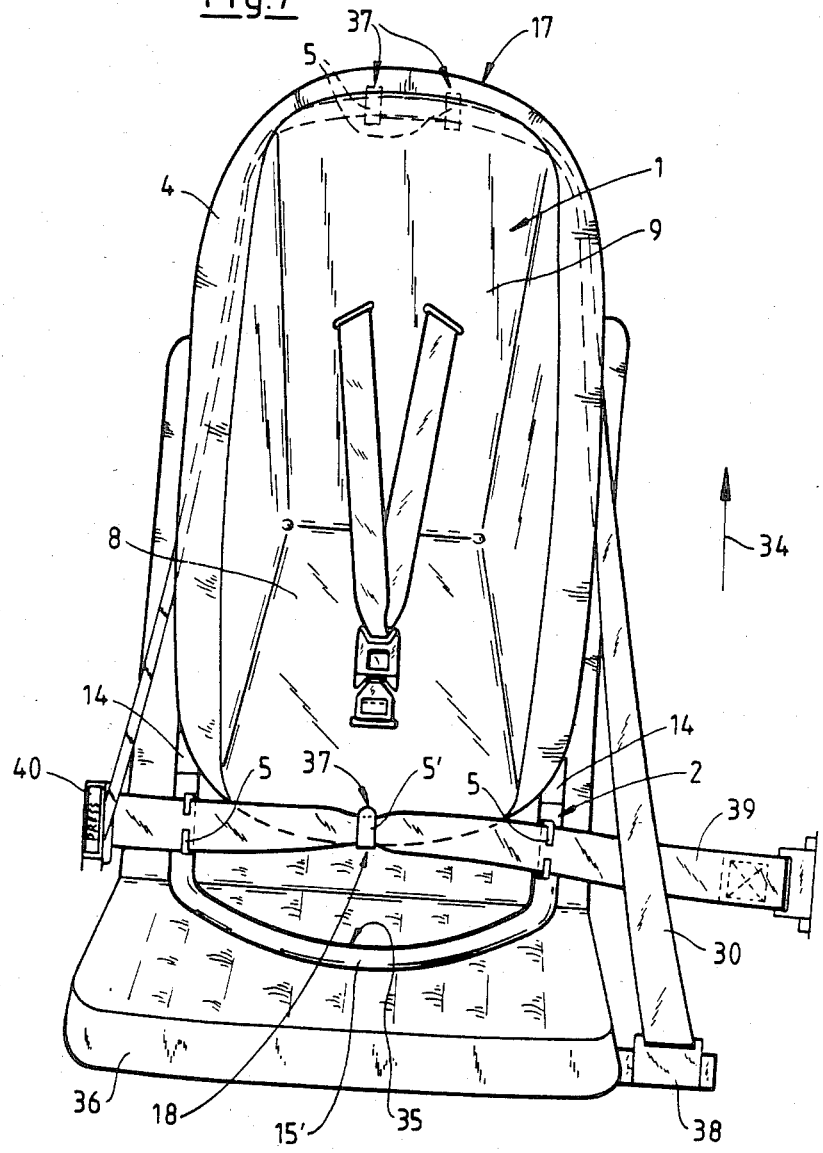
FIG. 7, a plan view on a safety seat in the direction of the arrow VII of FIG. 6, illustrating the course of the belt with belt guides in accordance with claims 26–29.
Figure 8:
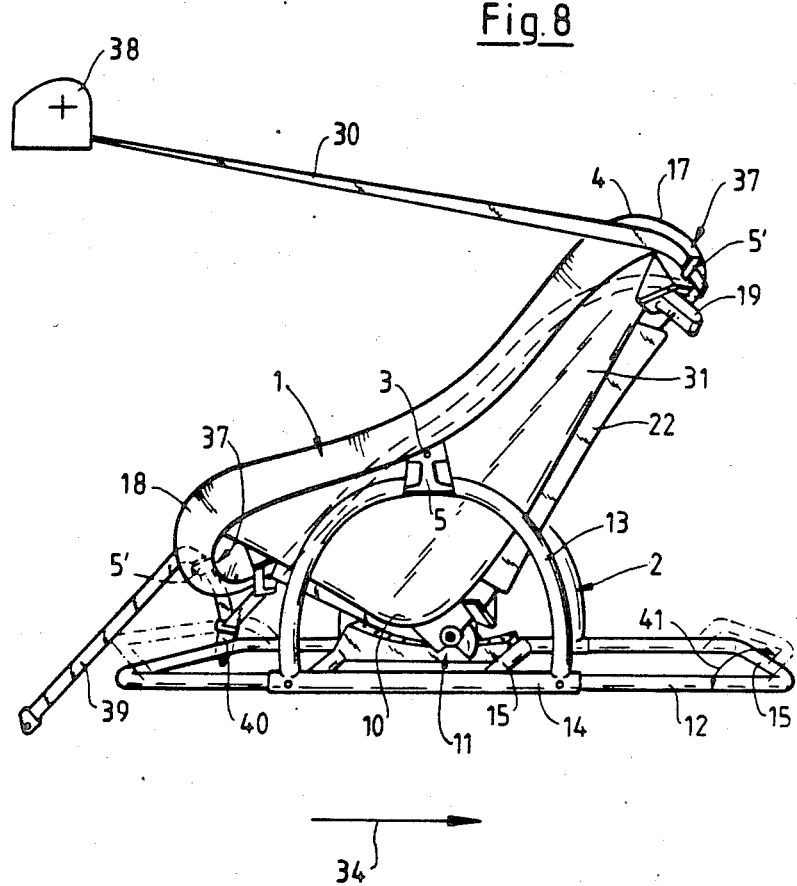
FIG. 8, a perspective side view of a safety seat in the installed position, analogous to FIG. 7 (but without belt guides 5 on the straight spars).

FIGS. 7 and 8 show the manner in which the safety seat is retained in its installed position in practical use, with the aid of the automatic lap and shoulder safety belts. FIG. 7 corresponds to a plan view on the safety seat according to the invention in the direction of the arrow VII in FIG. 6. The stirrup-like belt guides 5' are secured to the head end 17 or foot end 18 of the seat shell 1. For still better guidance, two belt guides 5' are provided in the head region here. These belt guides are disposed substantially vertically and are open at one end. The open end 37 is located at the top, and the belts can be inserted from this direction into the belt guides 5'. The course of the belt is as follows: From the belt roller 38, the lap and shoulder belt 30 is drawn through the two belt guides 5' located at the head end 17 of the seat shell 1. The lap portion 39 extends through the belt guide 5' located at the foot end 18 of the seat shell 1 and the two belt guides 5 on the top of the upwardly bent ends of the straight spars 14. By locking the safety belt buckle 40, the safety seat is held firmly on the seat of the car, particularly in the event of an accident. By means of the blocking mechanism of the lap and shoulder belt 30, the forces of acceleration acting in the direction of travel 34 are absorbed over the course of the belt. The forces counter to the direction of travel that arise in the event of a rear-end collision are transmitted via the holder frame 2 substantially to the seat back 36 and thereby rendered ineffective.

In FIG. 7, it is also particularly clearly shown that because of the illustrated course of the belt, the belt does not pass over the baby at any point. As a result, the occupant of the seat can be removed particularly quickly in an emergency. All that needs to be done is to open the retaining device of the seat itself (in this drawing figure, this device is a belt). A long and complicated search for the belt buckle 40 is unnecessary.

I claim:

1. A safety seat for the conveyance of babies and very small children in vehicles having
   a holder frame (2),
   a seat shell (1) swivelably supported therein about a shaft located in its crosswise direction and lockable in various swiveled positions relative to the holder frame (2), and
   at least one belt guide (5) for receiving an automatic lap and shoulder belt (30) or lap belt,
   characterized in that the locking catch (11) for attaining a long lever arm on the part of the locking action is disposed in a region, located far distant from the swivel bearing (3), of the seat shell outside that forms the bottom (10) of the seat shell (1), inside the overlapping area of the holder frame (2) and seat shell (1) and between them; and
   includes a manually operable locking member (24), which is shiftable toward the holder frame (2) and can be brought into engagement with the holder frame (2).

2. A safety seat as defined by claim 1,
characterized in that the seat shell (1) is approximately V-shaped in longitudinal section, having V-like legs substantially at right angles to one another to form the backrest and legrest; and
the locking catch (11) is disposed substantially centrally at the outside of the shell bottom (10) encompassing the area of the seat of the occupant of the safety seat, in the rounded transitional zone beetween the backrest area (9) and legrest area (8).

3. A safety seat as defined by claim 1,
characterized in that the holder frame (2) has a lock abutment (16) located opposite the locking catch (11) and having detent recesses (25), corresponding to the desired swiveled positions, for the locking member (24).

4. A safety seat as defined by claim 3,
characterized in that the detent recesses (25) in the lock abutment (16) are disposed on a circular arc (27) extending about the swivel axis and having a radius approximately corresponding to the distance between the locking member (24) and the swivel bearing (3).

5. A safety seat as defined by claim 1,
characterized in that the locking catch (11) has a detent lever (20), on which the locking member (24) is located.

6. A safety seat as defined by claim 5,
characterized in that the detent lever (20) is actuatable by means of at least one release lever (19).

7. A safety seat as defined by claim 6,
characterized in that one release lever each (19) is disposed on the foot end (18) and/or the head end (17) of the seat shell (1).

8. A safety seat as defined by claim 6,
characterized in that the locking catch (11) is releasable by means of the detent lever (20), which is actuatable by means of the release lever (19) via a pulling means (actuating rod 21), wherein the locking member can be disengaged by being moved out of the detent recesses (25) disposed on the lock abutment (16) of the holder frame (2).

9. A safety seat as defined by claim 8,
characterized in that the release lever (19), as a single-armed lever, is swivelably articulated on the head end (17) and/or foot end (18) of the seat shell outside and has a pivot bearing (23) for receiving the pulling means, in particular an actuating rod (21).

10. A safety seat as defined by claim 9,
characterized in that one release lever (19) each is attached to the head end (17) and foot end (18) of the seat shell outside;
two actuating rods (21) are rotatably secured each with one end on a respective release lever (19); and
the detent lever (20) is embodied as a double-armed lever, the arms of which each include an oblong slot (26) for longitudinally guided reception of the bent ends, remote from the release levers, of the two actuating rods (21), as a results of which the detent lever (20) can be pulled taut for effecting unlocking, by means of an actuating rod (21), but cannot be pushed away.

11. A safety seat as defined by claim 1,
characterized in that the holder frame (2), in the longitudinal direction of the seat shell (1), includes two support runners (12) located beside the seat shell (1) and joined to one another by means of a crosspiece (15).

12. A safety seat as defined by claim 11,
characterized in that the support runners (12) each are a combination of one straight spar (14) and one upwardly extending curved spar (13), in particular being in one piece, wherein the straight spars (14) engage the plane on which the holder frame (2) stands; and
at least one crosspiece (15) is disposed in the same plane as the plane on which the holder frame stands.

13. A safety seat as defined by claim 12,
characterized in that the lock abutment (16) having the detent recesses (25) is secured between two crosspieces (15) approximately centrally in the longitudinal direction of the holder frame (2).

14. A safety seat as defined by claim 13,
characterized in that the underside of the lock abutment (16) is disposed in the same plane as the crosspieces (15) and the straight spars (14) of the support runners (12).

15. A safety seat as defined by claim 11,
characterized in that the ends of the runners of the holder frame (2), in every swiveled position of the seat shell (1), protrude beyond the outlined surface projected into the plane on which the holder frame stands.

16. A safety seat as defined by claim 11,
characterized in that the opposed ends of the straight spars (14) are joined to one another by means of further crosspieces (15).

17. A safety seat as defined by claim 16,
characterized in that at least one opposed pair of straight spar ends is bent downward or upward at an obtuse angle to the plane on which the seat stands.

18. A safety seat as defined by claim 16,
characterized in that the opposed ends of the straight spars (14), preferably located toward the foot end of the seat shell, are joined together by means of a crosspiece (15') which, extending outside the plane on which the seat stands, preferably in a vertical curve, forms an impact surface (35).

19. A safety seat as defined by claim 18,
characterized in that the highest point on the crosspiece (15') with respect to the plane on which the seat stands is located higher than the swivel bearing (3) of the seat shell (1).

20. A safety seat as defined by claim 18,
characterized in that the crosspiece (15') is embodied in stirrup-like fashion.

21. A safety seat as defined by claim 18,
characterized in that the crosspiece (15') is embodied in platform-like fashion.

22. A safety seat as defined by claim 1,
characterized in that the swivel bearing (3) is located in the region between the rim (4) of the seat shell (1) and substantially the highest point on the curved spar (13).

23. A safety seat in particular as defined by claim 1,
characterized in that a belt guide (5) is secured, extending upward at a right angle, substantially in the same position as the swivel bearing (3), to each of the curved spars (13) of the support runners (12).

24. A safety seat as defined by claim 23,
characterized in that the belt guide (5) has approximately the form of a rectangular tube, the outward side of which is substantially centrally slit continuously in the longitudinal direction of the tube.

25. A safety seat as defined by claim 23,
characterized in that cumulatively or alternatively, additional belt guides (5) are secured in the vicinity of the runner ends, in particular to the curved spars (13) or straight spars (14).

26. A safety seat as defined by claim 1,
characterized in that one or more belt guides (5') are disposed on the seat shell outside, on the head end (17) and/or foot end (18) of the seat shell (1).

27. A safety seat as defined by claim 26,
characterized in that the belt guides (5') are embodied in stirrup-like fashion.

28. A safety seat as defined by claim 27,
characterized in that the stirrup-like belt guides (5') are open at one end, in such a manner that the belt can be inserted from the open end (37).

29. A safety seat as defined by claim 28,
characterized in that the belt guides (5') are substantially vertically disposed and the open end (37) in each case is at the top.

30. A safety seat as defined by claim 1,
characterized in that because of the upwardly extended side walls (31) of the seat shell (1), the rim (4) is embodied such that it is located approximately in one plane.

31. A safety seat as defined by claim 30,
characterized in that the rim (4) is embodied as an upholstered cushion extending continuously around the seat.

32. A safety seat as defined by claim 1,
characterized in that in each of the two side walls (31) of the seat shell (1), in the head and foot regions, two receiving slits (32) for two carrying straps (33) are provided, which in the active position extend over the open side of the seat shell and the ends of which are secured in the respective receiving slits (32) located transversely opposite one another.

33. A safety seat as defined by claim 32,
characterized in that the carrying straps (33) are made entirely or in part of an elastic material; and by being pulled over the rim (4) can be brought into an inactive position, in which they extend resting in a taut condition on the outside of the seat shell (1).

34. A safety seat as defined by claim 1,
characterized in that a safety retaining device for the baby or very small child includes an impact plate secured with belt straps.

35. A safety seat as defined by claim 1,
characterized in that the safety retaining device includes a retaining netting, which can be secured directly to the seat shell.

36. A safety seat as defined by claim 1,
characterized in that the safety retaining device is embodied as a bag in which the baby sits, surrounding the area of the baby's body remote from the chest.

37. A safety seat for the conveyance of babies and small children in vehicles, comprising:
a holder frame;
a seat shell having a bottom and including a legrest and a backrest, said seat shell being swivelably supported on said holder frame for pivotable movement about a swivel axis and so as to define an area of overlap between said bottom and said holder frame; and
means for locking said seat shell in a plurality of angular positions relative to said holder frame, said means including a locking catch disposed in said area of said overlap and spaced far distant from said swivel axis, said locking catch including a locking member carried by said seat shell manually retractably shiftable into locking engagement with said holder frame when said seat shell is in any one of said angular positions.

38. A safety seat as in claim 37, further comprising a swivel bearing mounted to said holder frame along said swivel axis, said seat shell being pivotably mounted to said holder frame by said swivel bearing.

39. A safety seat as in claim 37, further comprising at least one belt guide on at least one of said holder frame and said seat shell for receiving an automatic safety belt.

40. A safety seat as in claim 39, wherein said automatic safety belt is an automatic lap belt.

41. A safety seat as in claim 39, wherein said automatic safety belt is an automatic lap and shoulder belt.

42. A safety seat as in claim 37, wherein said seat shell is located above said holder frame and said swivel axis is located above said locking member.

* * * * *